(12) United States Patent
Mishra et al.

(10) Patent No.: US 10,005,555 B2
(45) Date of Patent: Jun. 26, 2018

(54) IMAGING USING MULTIPLE UNMANNED AERIAL VEHICLES

(71) Applicant: QUALCOMM Incorporated, San Diego, CA (US)

(72) Inventors: Lalan Jee Mishra, San Diego, CA (US); Jose G. Corleto Mena, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 15/144,105

(22) Filed: May 2, 2016

(65) Prior Publication Data
US 2017/0313416 A1 Nov. 2, 2017

(51) Int. Cl.
| | | |
|---|---|---|
| *H04N 7/18* | (2006.01) | |
| *B64C 39/02* | (2006.01) | |
| *G06K 9/00* | (2006.01) | |
| *B64D 47/08* | (2006.01) | |
| *B64D 47/00* | (2006.01) | |
| *B64D 47/02* | (2006.01) | |
| *G03B 15/03* | (2006.01) | |
| *G05D 1/10* | (2006.01) | |

(52) U.S. Cl.
CPC ............ *B64C 39/024* (2013.01); *B64D 47/00* (2013.01); *B64D 47/02* (2013.01); *B64D 47/08* (2013.01); *G03B 15/03* (2013.01); *G05D 1/104* (2013.01); *G06K 9/0063* (2013.01); *H04N 7/181* (2013.01); *B64C 2201/108* (2013.01); *B64C 2201/127* (2013.01); *B64C 2201/146* (2013.01)

(58) Field of Classification Search
CPC ...... H04N 7/181; G06K 9/0063; B64D 47/02; B64C 39/024; B64C 2201/108; B64C 2201/146
See application file for complete search history.

(56) References Cited

U.S. PATENT DOCUMENTS

| | | | |
|---|---|---|---|
| 9,056,676 B1 | 6/2015 | Wang | |
| 9,471,059 B1 * | 10/2016 | Wilkins | ............... G05D 1/0016 |
| 9,589,448 B1 * | 3/2017 | Schneider | ............ G08B 25/016 |
| 2009/0132165 A1 | 5/2009 | Gabrielsson et al. | |

(Continued)

FOREIGN PATENT DOCUMENTS

| | | |
|---|---|---|
| CN | 104129502 A | 11/2014 |
| WO | 2015095244 A1 | 6/2015 |

(Continued)

OTHER PUBLICATIONS

International Search Report and Written Opinion—PCT/US2017/018387—ISA/EPO—dated Apr. 19, 2017.

*Primary Examiner* — Tsion B Owens
(74) *Attorney, Agent, or Firm* — The Marbury Law Group, PLLC

(57) ABSTRACT

An aerial imaging system and method of aerially capturing an image including a first unmanned aerial vehicle (UAV) and a second UAV. The first UAV includes a camera and may be configured to receive input from an operator. The second UAV may be configured to dock with and deploy from the first UAV. The second UAV includes a light configured to provide remote illumination for the camera. The light on the second UAV may be activated to illuminate a target of photography by the camera while the second UAV is flown separate from the first UAV.

28 Claims, 8 Drawing Sheets

(56) References Cited

U.S. PATENT DOCUMENTS

| | | | |
|---|---|---|---|
| 2013/0314502 A1 | 11/2013 | Urbach et al. | |
| 2015/0377405 A1* | 12/2015 | Down | B64C 39/024 |
| | | | 73/865.8 |
| 2016/0304217 A1* | 10/2016 | Fisher | B60L 11/1809 |
| 2017/0253330 A1* | 9/2017 | Saigh | B64C 39/024 |

FOREIGN PATENT DOCUMENTS

| | | |
|---|---|---|
| WO | 2015107558 A1 | 7/2015 |
| WO | 2015180180 A1 | 12/2015 |
| WO | 2016015943 A1 | 2/2016 |

\* cited by examiner

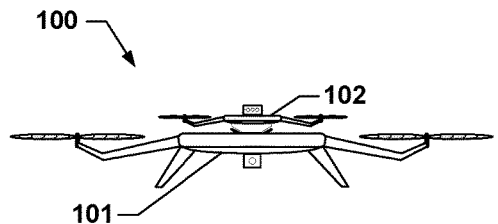
FIG. 2A
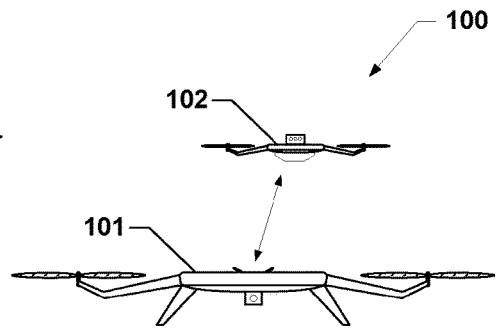
FIG. 2B
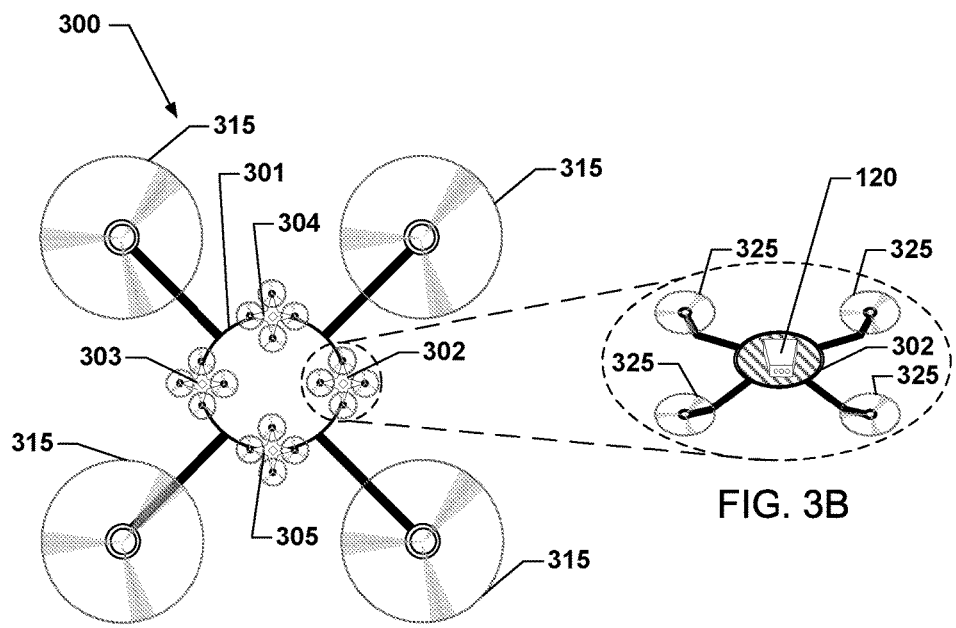
FIG. 3A
FIG. 3B

IMAGING USING MULTIPLE UNMANNED AERIAL VEHICLES

BACKGROUND

Unmanned aerial vehicles (UAVs), also referred to as "drones," are used for aerial photography and/or video surveillance. In poor daylight or low/no ambient light conditions, UAV cameras often depend on a built-in flash or an onboard light as a primary light source. However, the illumination provided by such lighting declines with the distance between the target and the light source. While stationary remote lights may be used to illuminate a scene, such lights require advanced setup, and cannot be easily reconfigured or moved.

SUMMARY

Systems, devices, and methods of various embodiments include an aerial imaging system including a first unmanned aerial vehicle (UAV) and a second UAV in which the first UAV includes a camera and may be configured to receive input from an operator. The second UAV may be configured to dock with and may include a light configured to provide illumination for the camera.

In various embodiments, the first UAV may be configured to fly while the second UAV is docketed on the first UAV, and the second UAV may be configured to deploy and fly independently from the first UAV.

The first UAV may include a processor configured to determine a position of the second UAV from a first image. The processor may be further configured to determine the position of the second UAV from camera images. The processor may be configured to determine an aerial position of the second UAV flying separate from the first UAV based on a comparison of camera images and images received from the second UAV.

In various embodiments, the second UAV may be configured to fly separate from the first UAV to a predetermined aerial position relative to the first UAV without input from an operator of the first UAV. In some embodiments, the second UAV may include a microphone configured to record sounds. In some embodiments, the second UAV may be configured to use signals received from a proximity sensor to maintain a determined aerial position of the second UAV relative to a target of photography by the camera.

In some embodiments, the second UAV may include a processor configured to recognize a target of photography by the camera in images obtained from an image capture device on the second UAV, and to maintain an aerial position relative to a target of photography by the camera. In some embodiments, the second UAV may be controlled to fly to a position relative to a target of photography by the camera in order to provide a determined amount of illumination of the target of photography. In some embodiments, the amount of illumination provided by the light on the second UAV may be adjustable by changing the aerial position of the second UAV or changing a level of light emitted from the second UAV. The light may emit in an infrared spectrum and the camera may be configured for thermal imaging.

In some embodiments, a third UAV may be configured to dock with and deploy from the first UAV. In some embodiments, the first UAV may be configured to fly while supporting both the second UAV and the third UAV. In some embodiments, the camera on the first UAV and the first UAV may be configured to use camera images for controlling the second UAV. In some embodiments, the camera may be configured to contemporaneously capture two or more different images. In some embodiments, the camera may be configured so that the two or more different images overlap.

Some embodiments may include deploying, from a first unmanned aerial vehicle (UAV) including a camera, a second UAV to fly separate from the first UAV, activating a light on the second UAV to illuminate a target of photography by the camera, and activating the camera to photograph the target of photography illuminated by the light. Some embodiments may include flying the second UAV separate from the first UAV without input from a remotely controlling operator of the first UAV. Some embodiments may include flying the first UAV while the second UAV is docked on the first UAV. Some embodiments may include activating the camera to photograph the target of photography to contemporaneously capture two or more different images, which may overlap.

Some embodiments may include re-docking the second UAV with the first UAV after activating the camera to photograph the target of photography. Some embodiments may include activating a microphone on the second UAV for recording sounds emanating from a target of a sound recording.

Some embodiments may include deploying a third UAV from the first UAV, and flying the first UAV while supporting both the second UAV and the third UAV. Some embodiments may include determining a position of the second UAV using camera images from the camera for controlling the second UAV. Some embodiments may include receiving by the first UAV remotely captured visual images taken by another camera on the second UAV. Some embodiments may include determining an aerial position of the second UAV flying separate from the first UAV based on comparing an onboard visual image captured by the camera on the first UAV and the remotely captured visual image taken by the other camera on the second UAV. Some embodiments may include transmitting from the first UAV to the second UAV a command for the second UAV to maintain a predetermined aerial position relative to the first UAV. Some embodiments may include transmitting from the first UAV to the second UAV a command for the second UAV to maintain a predetermined aerial position relative to the target of photography by the camera. Some embodiments may include receiving location information for determining an aerial position of the second UAV from the second UAV flying remote from the first UAV. Some embodiments may include determining a relative position of the second UAV relative to the first UAV. Some embodiments may include determining an amount of illumination provided by the light on the second UAV. Some embodiments may include determining an adjustment needed for the amount of illumination provided by the light on the second UAV and transmitting instructions to the second UAV for making the adjustment needed for the amount of illumination provided by the light on the second UAV.

Further embodiments may include an aerial imaging system including a first UAV and a second UAV in which the first and second UAVs include means for performing functions of the methods summarized above. Further embodiments may include non-transitory processor-readable storage media having stored thereon processor-executable instructions configured to cause a processor of a first UAV to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIG. 2A is a front elevation view of an aerial imaging system including a first UAV supporting a second UAV docked thereon according to various embodiments.

FIG. 2B is a front elevation view of the aerial imaging system of FIG. 2A with the second UAV flying separate from the first UAV according to various embodiments.

FIG. 3A is a top view of an aerial imaging system including a first UAV supporting a second UAV, a third UAV, a fourth UAV, and a fifth UAV piggybacking on the first UAV according to various embodiments.

FIG. 3B is a perspective relief view of the second UAV of FIG. 3A according to various embodiments.

DETAILED DESCRIPTION

Figure 1:
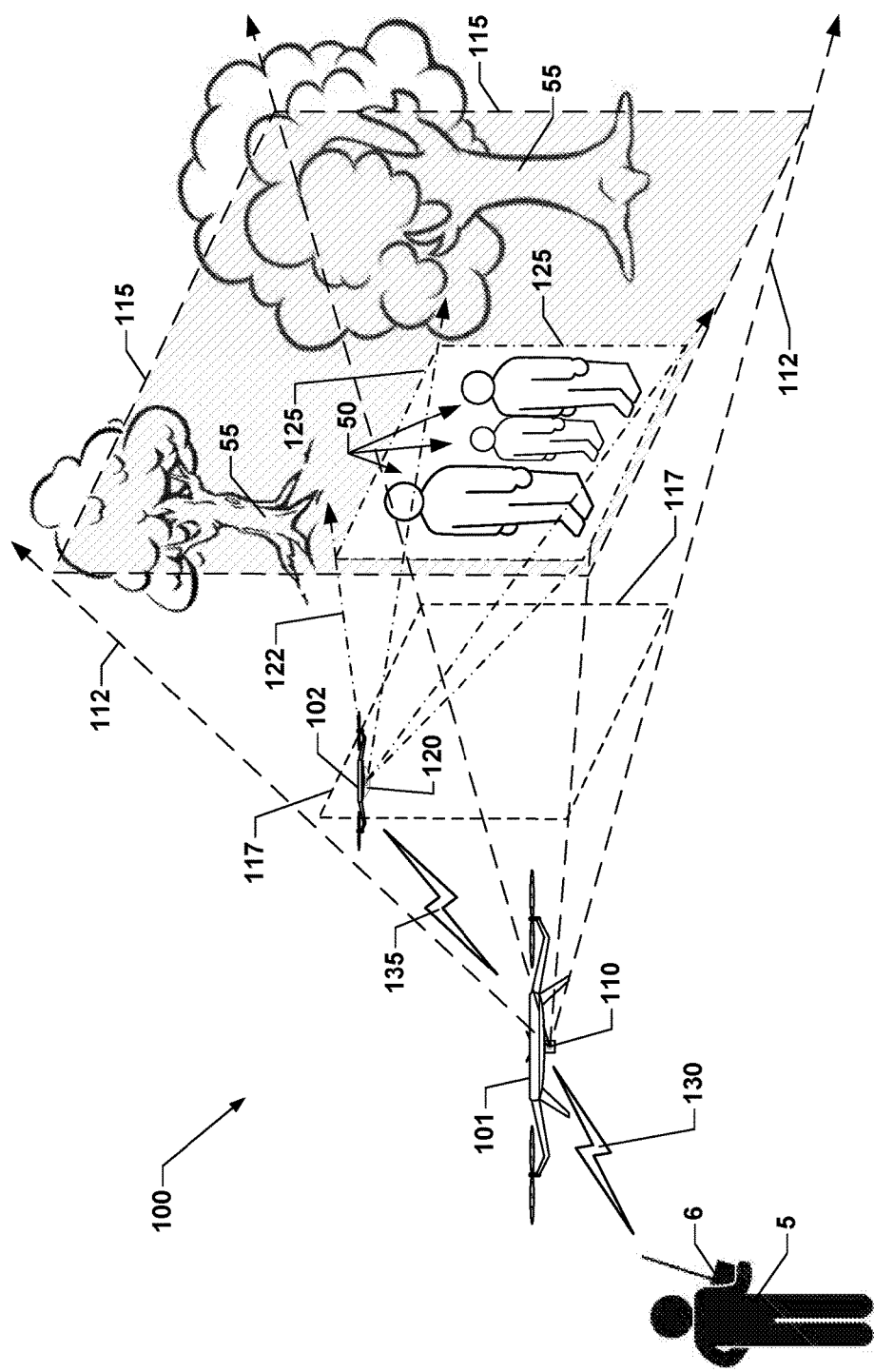
FIG. 1 is a schematic perspective view of an aerial imaging system including a first UAV capturing an image of targets illuminated by a second UAV according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include an aerial imaging system that includes at least two UAVs. A first unmanned aerial vehicle (UAV) includes a camera and is configured to receive input from an operator. A second UAV is configured to dock with and deploy from the first UAV. The second UAV includes a light for illuminating a target being captured as a first image by the camera on the first UAV. Positioning an illumination source on the second UAV enables the aerial imaging system to capture images by the first UAV at a first distance from a subject or scene that is illuminated by the second UAV at a second distance from the subject or scene that may be selected or controlled to achieve a desired or minimum level of illumination. Thus, when the distance from the subject or scene selected for gathering images by the first UAV would attenuate light from the illumination source on the second UAV to an unacceptable level, the second UAV may separate from the first UAV and fly to a position closer to the subject or scene where proper or desired illumination can be achieved. Multiple illumination UAVs may be implemented in the aerial imaging system, enabling lighting from different directions.

As used herein, the term "UAV" refers to one of various types of unmanned aerial vehicles. A UAV may include an onboard computing device configured to fly and/or operate the UAV without remote operating instructions (i.e., autonomously), and/or with some remote operating instructions or updates to instructions stored in a memory, such as from a human operator or remote computing device (i.e., semi-autonomously). UAVs may be propelled for flight in any of a number of known ways. For example, a plurality of propulsion units, each including one or more rotors, may provide propulsion or lifting forces for the UAV and any payload carried by the UAV. In addition, UAVs may include wheels, tank-treads, or other non-aerial movement mechanisms to enable movement on the ground, on or in water, and combinations thereof. The UAV may be powered by one or more types of power source, such as electrical, chemical, electro-chemical, or other power reserve, which may power the propulsion units, the onboard computing device, and/or other onboard components.

The term "computing device" is used herein to refer to an electronic device equipped with at least a processor. Examples of computing devices may include UAV flight control and/or mission management computer that are onboard the UAV, as well as remote computing devices communicating with the UAV configured to perform operations of the various embodiments. Remote computing devices may include wireless communication devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, and servers. In various embodiments, computing devices may be configured with memory and/or storage as well as wireless communication capabilities, such as network transceiver(s) and antenna(s) configured to establish a wide area network (WAN) connection (e.g., a cellular network connection, etc.) and/or a local area network (LAN) connection (e.g., a wireless connection to the Internet via a Wi-Fi® router, etc.).

FIG. 1 illustrates an example of an aerial imaging system 100 with a first UAV 101 and a second UAV 102 according to various embodiments. In the example illustrated in FIG. 1, the first UAV 101 includes a camera 110 and is configured to receive input or instructions from an operator 5 using a wireless communication device 800 via an operator communication link 130. The operator 5 may initiate and control the flight of the first UAV 101, and may control the camera 110, such as for photographing a target 50. The second UAV 102 includes a light 120 for illuminating the target 50 being photographed by the first UAV 101. Alternatively, the first UAV 101 may include the light 120 and the second UAV 102 may include the camera 110. As a further alternative, both the first UAV 101 and the second UAV 102 may each include a light 120 and a camera 110.

In some embodiments, the second UAV 102 is configured to dock with and deploy from the first UAV 101 so that the first UAV 101 may carry the second UAV 102 to a photography location. In some embodiments, the first UAV 101 is configured to dock with second UAV 102 and deploy from the so that the second UAV 102 may carry the first UAV 101 to a photography location. In some embodiments the first UAV 101 and the second UAV 102 may be configured to dock with and deploy from a third UAV (see for example FIG. 3A) so that the third UAV may carry the first UAV 101 and second UAV 102 to a photography location.

In order to coordinate the illumination output from the light 120 with the photography taken by the camera 110, the second UAV 102 may be synchronized with the first UAV 101. Using an inter-UAV communication link 135, the first UAV 101 may control the navigation of the second UAV 102 and keep the first and second UAVs 101, 102 synchronized.

For ease of description and illustration, some detailed aspects of the first UAV 101 and second UAV 102 are omitted, such as wiring, frame structure, power source, landing columns/gear, or other features that would be known to one of skill in the art. In addition, although in various embodiments the UAVs are illustrated as quad copters with four rotors, the UAVs may include more or fewer than four rotors. Also, the first UAV 101 and second UAV 102 may behave similar or different configurations, numbers of rotors, and/or other aspects.

The camera 110 may focus light reflected or emitted from virtually anything within a field of view 112 onto an internal light-sensitive surface for capturing one or more images. In this way, the camera 110 captures images for still and/or video photography. The camera 110 may be pivotally mounted on the first UAV 101 or otherwise adjustable to provide 3-axis pointing control. The field of view 112 includes the extent of the observable world seen by the camera 110, which extends outwardly away from the camera 110 toward infinity. The camera 110 may be focused on the target 50 when the target 50 is within the field of view 112 and, if applicable, within the focal limits of the camera 110. The field of view 112 may include nearby objects 55 and intervening objects, such as the second UAV 102. The target 50 may include one or more creatures and/or objects that is/are the focus of the photography, such as the three individuals shown in FIG. 1.

In various embodiments, the light 120 on the second UAV 102 provides a light source and/or a supplemental light source to enable the source of illumination for photography (i.e., still and/or video photography) to be positioned closer to the target 50 than the camera 110 and/or to provide illumination from an angle different from that of the perspective of the camera 110. The second UAV 102, along with the light 120, may fly separate from the first UAV 101 and be positioned to project light from a position removed from that of the first UAV 101.

When ambient light conditions are low or less than desirable, various embodiments may use the light 120 on the second UAV 102 to create a lighted region 122. The lighted region 122 may enhance the illumination in part of the field of view 112 of the camera 110, thus projecting additional illumination on the target 50. When the lighted region 122 is much smaller than the field of view 112, the nearby objects 55 within the field of view 112 may not receive the same level of illumination as the target 50 if such objects are disposed outside the lighted region 122. Also, because the lighted region 122 projects away from the second UAV 102 (i.e., toward the target 50), the second UAV 102 itself, or parts thereof, may not be included in the lighted region 122.

A relative position of the target 50 is further illustrated using a first frame of reference 115, a second frame of reference 117, and a third frame of reference 125. The first frame of reference 115 corresponds to an imaginary planar extent bounded by the field of view 112, perpendicular to a direction in which the camera 110 is facing, and includes a focal point on the target 50. The second frame of reference 117 also corresponds to an imaginary planar extent bounded by the field of view 112 and perpendicular to the direction in which the camera 110 is facing, but corresponds to a location of the second UAV 102 and includes a point from which the light 120 emanates. The third frame of reference 125 corresponds to an imaginary planar extent that is both bounded by the lighted region 122 and within the first frame of reference 115.

In various embodiments, the first UAV 101 and the second UAV 102 may be configured to dock with one another. The second UAV 102 may couple to the first UAV 101 via a coupling controlled by either of the two UAVs, or both UAVs 101, 102. Such a coupling may provide sufficient structural rigidity to secure the second UAV 102 while the first UAV 101 transits and performs various aerial maneuvers. In the docked configuration, the second UAV 102 may piggyback on an upper region of the first UAV 101. Alternatively, the second UAV 102 may dock on another portion of the first UAV 101, such as attached to a lateral or lower side thereof. Lateral and/or lower side docking arrangements may need to further consider the interaction of aerodynamic forces between the first UAV 101 and the second UAV 102. Turbulence generated by the rotors of the first UAV 101 may interfere with the deployment and/or re-docking of the second UAV 102. An area above the first UAV 101, while in flight, tends to be a lower region of turbulence. Thus, the second UAV 102 may try to remain in the region above the flight path of the first UAV 101 in order to avoid turbulence and loss of control. As a further alternative, the second UAV 102 may be partially or fully held inside the first UAV 101 while in the docked configuration.

The first UAV 101 may be configured to fly while supporting the second UAV 102 when operating in the docked configuration. Thus, the aerial imaging system 100 may use the camera 110 and the light 120 either while the first UAV 101 and the second UAV 102 are in the docked configuration or after the two UAVs have separated. For example, when the target 50 being photographed is near the camera 110 or the light 120 is not needed due to the ambient lighting conditions, the first and second UAVs 101, 102 may remain in the docked configuration. Thus, the first UAV 101 may take one or more photographs either by using the camera 110 without using the light 120 (e.g., ambient light is sufficient) or using the camera 110 and the light 120 together while the second UAV 102 remains docked with the first UAV 101. Once the target 50 is far enough away from the camera 110 that the light 120 cannot provide sufficient illumination when the first and second UAVs 101, 102 are docked, the second UAV 102 may deploy from the first UAV 101 and fly to a location closer to the target 50 where the lighted region 122 provides sufficient illumination of the target.

Once deployed from the first UAV 101, the second UAV 102 may fly to a designated aerial position relative to the first UAV 101 and/or the target 50 without navigational instructions from the operator 5. The designated aerial position may be determined for providing enhanced illumination to the target 50 being photographed. The first UAV 101, the second UAV 102, or both UAVs may automatically determine the designated aerial position for illuminating the target under the current lighting conditions and desired photographic effects. Alternatively, the designated aerial position for the second UAV 102 relative to the first UAV 101 may be a predetermined relative position, such as a default standoff position (e.g., five meters away from the first UAV 101 at a set angle and direction). Navigation of the second UAV 102 to the designated aerial position may be fully controlled by the first UAV 101, controlled by the first UAV 101 based on information/feedback received from the second UAV 102, or controlled independently by the second UAV 102.

FIGS. 2A-2B are front elevation views of the aerial imaging system 100 according to various embodiments. With reference to FIGS. 1-2A, the aerial imaging system 100 may include the first UAV 101 supporting the second UAV 102 docked thereon (e.g., as shown in FIG. 2A). One or both of the first UAV 101 and the second UAV 102 may include an automatic latching mechanism for securely holding the two UAVs 101, 102 together to maintain a docked configuration. In order to separate the two UAVs 101, 102, such as for deploying the second UAV 102, the automatic latching mechanism may disengage.

With reference to FIGS. 1-2B, the second UAV 102 (e.g., as shown in FIG. 2B) may be deployed and fly separate from the first UAV 101. In some embodiments, an ejection mechanism may be included that quickly separates the two UAVs 101, 102.

In alternative embodiments (not shown), the second UAV 102 may be carried on an underside of the first UAV 101, which would enable to second UAV 102 to make use of gravity to quickly separate from the first UAV 101 by free-falling for a few seconds when the second UAV 102 is released from the first UAV 101. Due to the significant turbulence generated from the downdraft of the first UAV 101, in flight re-docking to the underside of the first UAV 101 may be infeasible. Therefore, additional procedures may be necessary to re-dock the second UAV 102 to the underside of the first UAV 101, such as manual re-docking performed by the operator 5 after landing.

FIG. 3A is a top view of an aerial imaging system 300 in accordance with various embodiments. With reference to FIGS. 1-3A, the aerial imaging system 300 may include a first UAV 301 plus a second UAV 302, a third UAV 303, a fourth UAV 304, and a fifth UAV 305 docked on the first UAV 301. The aerial imaging system 300 may include more or fewer UAVs in various embodiments. The first UAV 301 may include the camera (e.g., 110) and is illustrated as a quad copter configuration with four rotors 315, although the first UAV 301 may include more or fewer rotors. Each of the second, third, fourth, and fifth UAVs 302, 303, 304, 305 may be configured to dock with and deploy from the first UAV 301. The first UAV 301 may be configured to fly while supporting some or all of the second UAV 302, the third UAV 303, the fourth UAV 304, and/or the fifth UAV 305. Alternatively, one or more of the second UAV 302, the third UAV 303, the fourth UAV 304, and/or the fifth UAV 305 may include the camera 110 in addition to or instead of the first UAV 301. Regardless of which UAV (e.g., 301, 302, 303, 304, 305) includes the camera, the other ones of the first UAV 301, second UAV 302, the third UAV 303, the fourth UAV 304, and/or the fifth UAV 305 may include the light (e.g., 120 in FIG. 1) for providing illumination for the camera 110.

FIG. 3B is a perspective relief view of the second UAV 302 in FIG. 3A. With reference to FIGS. 1-3B, the second UAV 302 (which may be similar to the second UAV 102) may include the light 120 and/or additional sensors, such as a microphone. Similarly, one or more of the third, fourth, and fifth UAVs 303, 304, 305 may include a light (e.g., 120) and/or additional sensors and/or microphones. The second, third, fourth, and fifth UAVs 302, 303, 304, 305 are illustrated as quad copters with four rotors 325; however, any of the second, third, fourth, and fifth UAVs 302, 303, 304, 305 may be configured with more or fewer rotors.

Figure 4A:
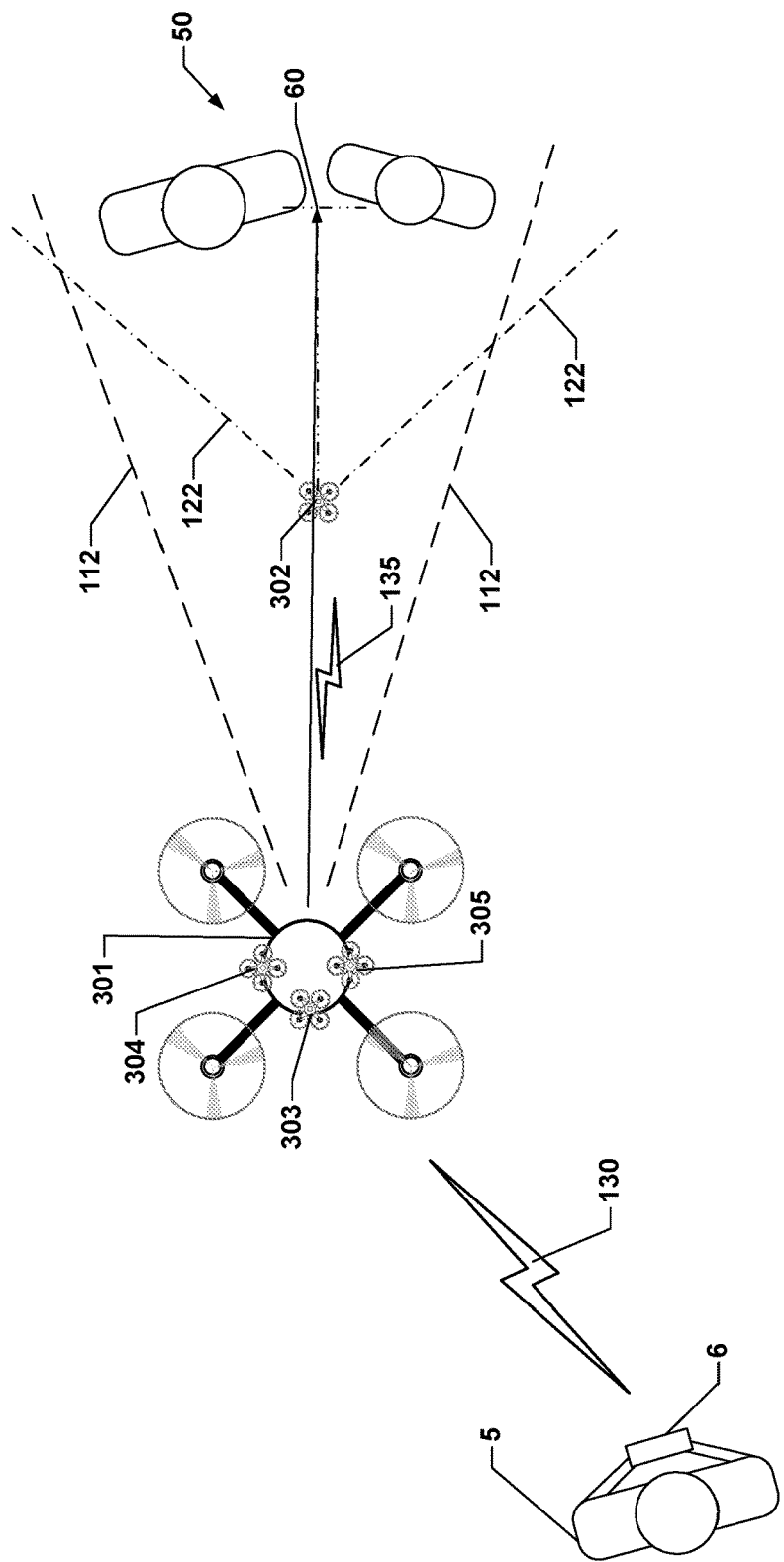
FIG. 4A is a top schematic view of an aerial imaging system including a first UAV with a second UAV flying separate from the first UAV and a third UAV, a fourth UAV, and a fifth UAV piggybacking on the first UAV according to various embodiments.

FIG. 4A is a top schematic view of the aerial imaging system 300 including the first UAV 301, the second UAV 302, the third UAV 303, the fourth UAV 304, and the fifth UAV 305 according to various embodiments. With reference to FIGS. 1-4A, the second UAV 302 is shown flying separate from the first UAV 301, while the third UAV 303, the fourth UAV 304, and the fifth UAV 305 remain docked in a piggybacking configuration on the first UAV 301. The first UAV 301 is configured to receive input from the operator 5 via the operator communication link 130 to the wireless control unit 6. In addition to initiating and controlling flight of the first UAV 101, the operator 5 may, directly or indirectly, initiate and control flight of any of the second UAV 302, the third UAV 303, the fourth UAV 304, and/or the fifth UAV 305, such as by transmitting a deployment command. The deployment command may be part of a process that may be initiated manually by the operator or automatically by a processer (e.g., of the first UAV 101) when enhanced lighting is needed for a photograph to be taken by the first UAV 101. The inter-UAV communication link 135 may control the navigation of the second UAV 302 and keep the first and second UAVs 301, 302 synchronized. In addition, the processor may control, via the inter-UAV communication link 135, the activation of the light (e.g., 120) on the second UAV 302 that generates the lighted region 122.

The second UAV 302 may be deployed toward a focal point 60 on or near the target 50. However, it may be desirable to avoid having the second UAV 302 fly to an aerial position that lies between the camera (e.g., 120) and the target 50, since the second UAV 302 would thus block at least part of any photograph. Thus, the second UAV 302 may be directed to fly at a higher elevation than the target 50, either staying on the fringe of the field of view 112 or just outside thereof. Alternatively, the second UAV 302 may be directed to land on the ground or hover just off the ground in front of the target 50, which may also be either on the fringe of the field of view 112 or just outside thereof. The designated aerial position of the second UAV 302 may be selected based on a desired angle for the light (e.g., 120) to emit in generating the lighted region 122. For example, light emitted from above the target 50 may more naturally emulate sunlight.

Figure 4B:
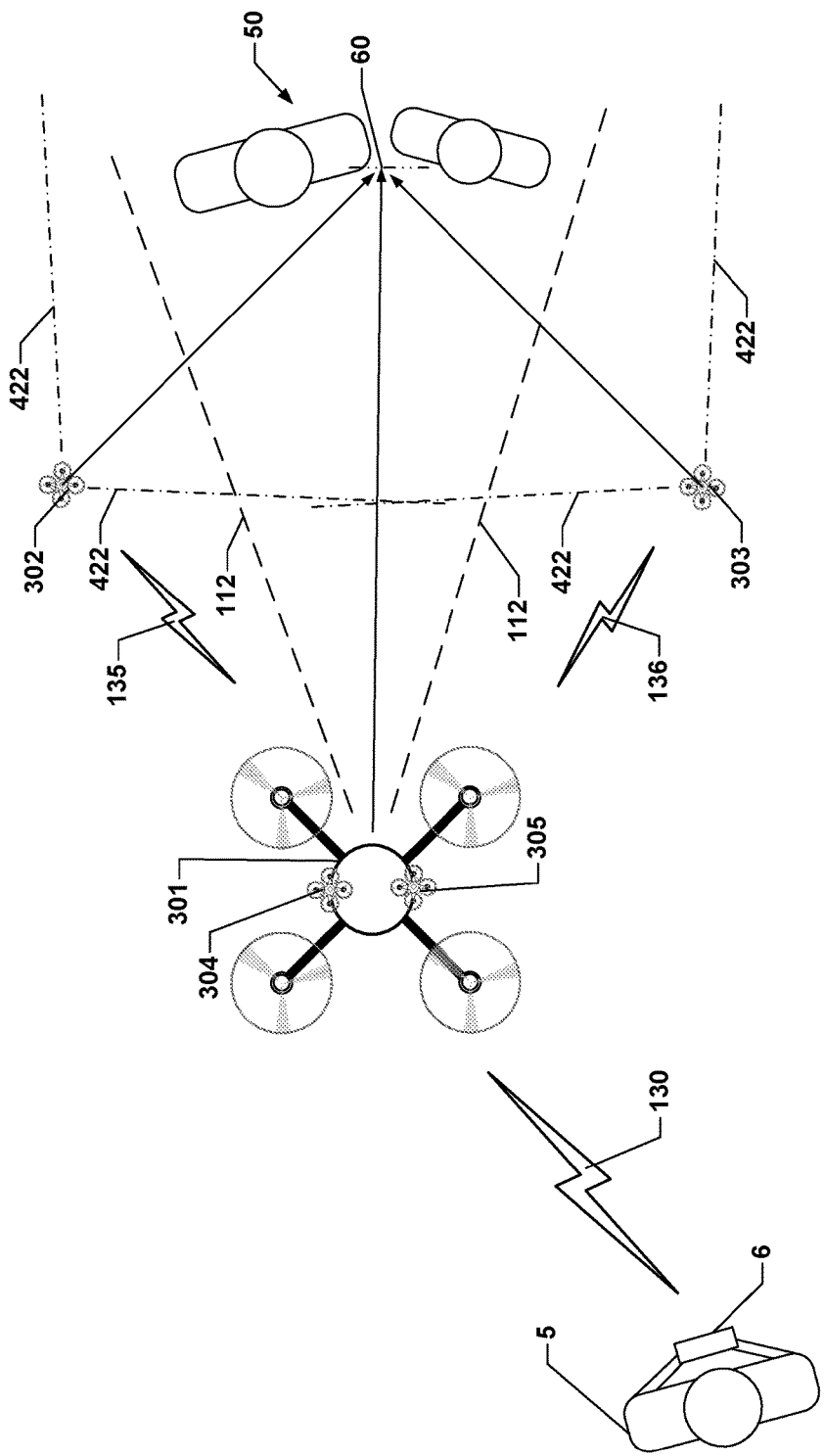
FIG. 4B is a top schematic view of the aerial imaging system of FIG. 4A with both the second UAV and the third UAV flying separate from the first UAV according to various embodiments.

FIG. 4B is a top schematic view of the aerial imaging system 300 including the first UAV 301, the second UAV 302, the third UAV 303, the fourth UAV 304, and the fifth UAV 305 according to various embodiments. With reference to FIGS. 1-4B, the second UAV 302 and the third UAV 303 are shown flying separate from the first UAV 301, while the fourth UAV 304 and the fifth UAV 305 remain docked in a piggybacking configuration on the first UAV 301. When two of the second, third, fourth, and fifth UAVs 302, 303, 304, 305 are deployed, it may be desirable to select two oppositely docked UAVs for deployment (e.g., 302 and 303; or 304 and 305) in order to maintain symmetry in the piggybacking configuration of the remaining UAVs on the first UAV 301 for flight stability.

Separate inter-UAV communication links 135, 136 may control the navigation of the second UAV 302 and the third UAV 303, respectively. The inter-UAV communication links 135, 136 may keep the first UAV 301 synchronized with each of the second UAV 302 and the third UAV 303. In addition, the inter-UAV communication links 135, 136 may control the activation of separate lights (e.g., 120) on each of the second UAV 302 and the third UAV 303 for generating separate lighted regions 422. Having the separate lighted regions 422 overlap but originate from opposite sides of the target 50 may avoid shadows on the target 50. In various embodiments there may be direct inter-UAV communication links between one or more of the second, third, fourth, and fifth UAVs 302, 303, 304, 305.

Figure 5:
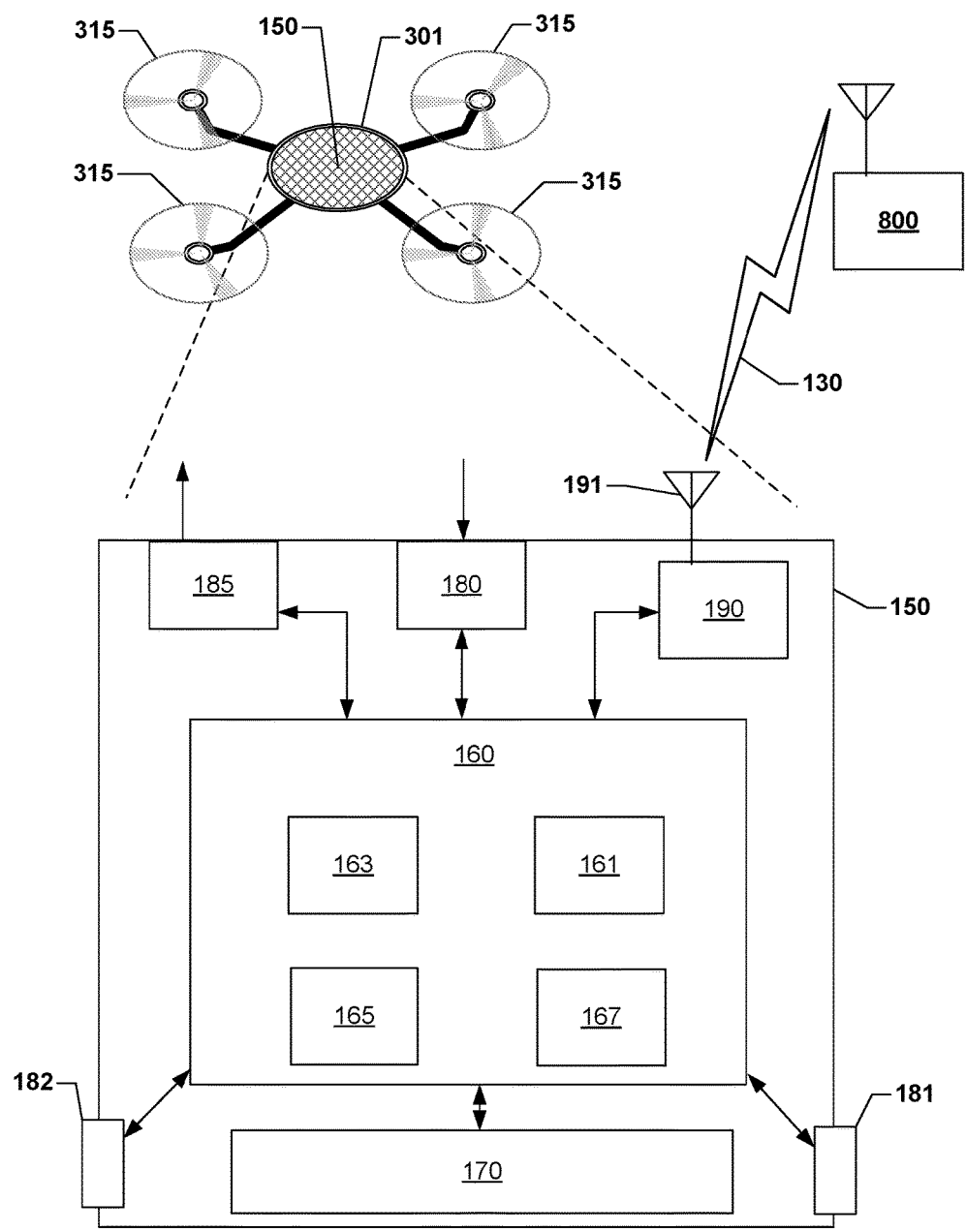
FIG. 5 is a component diagram of a control unit of a UAV suitable for use with various embodiments.

FIG. 5 illustrates a configuration of the first UAV 301 that may be used for any of the UAVs in various embodiments. With reference to FIGS. 1-5, the first UAV 301 may include a control unit 150 that may house various circuits and devices used to power and control the operation of the first UAV 301, as well as any other UAVs controlled by the first UAV 301. The control unit 150 may include a processor 160, a power module 170, an input module 180, a camera 181, sensors 182, an output module 185, and a radio module 190 coupled to an antenna 191. The processor 160 may include or be coupled to memory 161 and a navigation unit 163. The processor 160 may be configured with processor-executable instructions to control flight and other operations of the first UAV 301, including operations of the various embodiments. The processor 160 may be coupled to one or more cameras 181 and sensors 182.

The camera 181 may include one or more image capturing devices for photographing the target (e.g., 50). More than one image capturing device may be configured to contemporaneously capture two different images including the target. For example, a first image may include both the target and the second UAV (e.g., 102), while a second image may include the target but not the second UAV. Alternatively, the camera 181 may be configured to detect light in the infrared spectrum for thermal imaging. Such thermal imaging features may be enhanced if the light emitted from the second UAV extends to the infrared spectrum.

The sensors 182 may be optical sensors (e.g., light meters for controlling exposure and determining whether additional illumination is required), radio sensors, a rotary encoder, pressure sensors (i.e., for detecting wind, lift, drag, or changes therein) or other sensors. Alternatively or additionally, the sensors 182 may be contact or pressure sensors that may provide a signal that indicates when the first UAV 301 has landed.

The power module 170 may include one or more batteries that may provide power to various components, including the processor 160, the input module 180, the sensors 182, the output module 185, and the radio module 190. In addition, the power module 170 may include energy storage components, such as rechargeable batteries. In this way, the processor 160 may be configured with processor-executable instructions to control the charging of the power module 170, such as by executing a charging control algorithm using a charge control circuit. Alternatively or additionally, the power module 170 may be configured to manage its own charging. The processor 160 may be coupled to an output module 185, which may output control signals for managing the motors that drive the rotors 315 and other components.

Through control of the individual motors of the rotors 315, the first UAV 301 may be controlled in flight. The processor 160 may receive data from the navigation unit 163 and use such data in order to determine the present position and orientation of the first UAV 301, as well as the appropriate course towards the target (e.g., 50). In various embodiments, the navigation unit 163 may include a global navigation satellite system (GNSS) receiver system (e.g., one or more Global Positioning System (GPS) receivers) enabling the first UAV 301 to navigate using GNSS signals. Alternatively or in addition, the navigation unit 163 may be equipped with radio navigation receivers for receiving navigation beacons or other signals from radio nodes, such as navigation beacons (e.g., very high frequency (VHF) Omni Directional Radio Range (VOR) beacons), Wi-Fi access points, cellular network sites, radio station, remote computing devices, other UAVs, etc.

The processor 160 and/or the navigation unit 163 may be configured to communicate with a server through a wireless connection (e.g., a cellular data network) to receive commands to use or stop using the extended flight protocol, receive data useful in navigation, provide real-time position altitude reports, and assess data. An avionics module 167 coupled to the processor 160 and/or the navigation unit 163 may be configured to provide flight control-related information such as altitude, attitude, airspeed, heading and similar information that the navigation unit 163 may use for navigation purposes, such as dead reckoning between GNSS position updates. The avionics module 167 may include or receive data from a gyro/accelerometer unit 165 that provides data regarding the orientation and accelerations of the first UAV 301 that may be used in navigation and positioning calculations.

The radio module 190 may be configured to receive signals via the antenna 191, such as command signals to initiate, continue, or discontinue the use of the light (e.g., 120) from the second UAV (e.g., 302), receive signals from aviation navigation facilities, etc., and provide such signals to the processor 160 and/or the navigation unit 163 to assist in operation of the first UAV 301. In some embodiments, commands for controlling the first UAV 301 and/or the second UAV 302, or components thereof may be received via the radio module 190. In some embodiments, the first UAV 301 may receive signals from a wireless control unit 6. For example, the operator communication link 130 may include input from a knowledge base regarding current conditions, a current orientation of the first UAV 301 or elements thereof, predicted future conditions, requirements for particular UAV maneuvers or missions, aiming parameters of the camera or even information regarding a target of the photography.

In various embodiments, the radio module 190 may be configured to switch between a cellular connection and a Wi-Fi or other form of radio connection depending on the location and altitude of the first UAV 301. For example, while in flight at an altitude designated for UAV traffic, the radio module 190 may communicate with a cellular infrastructure in order to maintain communications with a server. In addition, communications with the wireless control unit 6 may be established using cellular telephone networks while the first UAV 301 is flying out of line-of-sight with the operator 5. Communication between the radio module 190 and the operator communication link 130 may transition to a short-range communication link (e.g., Wi-Fi or Bluetooth) when the first UAV 301 moves closer to the wireless control unit 6. Similarly, the first UAV 301 may include and employ other forms of radio communication, such as mesh connections with other UAVs or connections to other information sources (e.g., balloons or other stations for collecting and/or distributing weather or other data harvesting information).

In various embodiments, the control unit 150 may be equipped with the input module 180, which may be used for a variety of applications. For example, the input module 180 may receive and pre-process images or data from an onboard camera 181 or sensor 182, or may receive electronic signals from other components (e.g., a payload). The input module 180 may receive an activation signal for causing actuators on the first UAV 301 to deploy landing cushions or similar components for affecting an emergency landing. In addition, the output module 185 may be used to activate components (e.g., an energy cell, an actuator, an indicator, a circuit element, a sensor, and/or an energy-harvesting element).

While the various components of the control unit 150 are illustrated in FIG. 5 as separate components, some or all of the components (e.g., the processor 160, the output module 185, the radio module 190, and other units) may be integrated together in a single device or module, such as a system-on-chip module.

Figure 6:
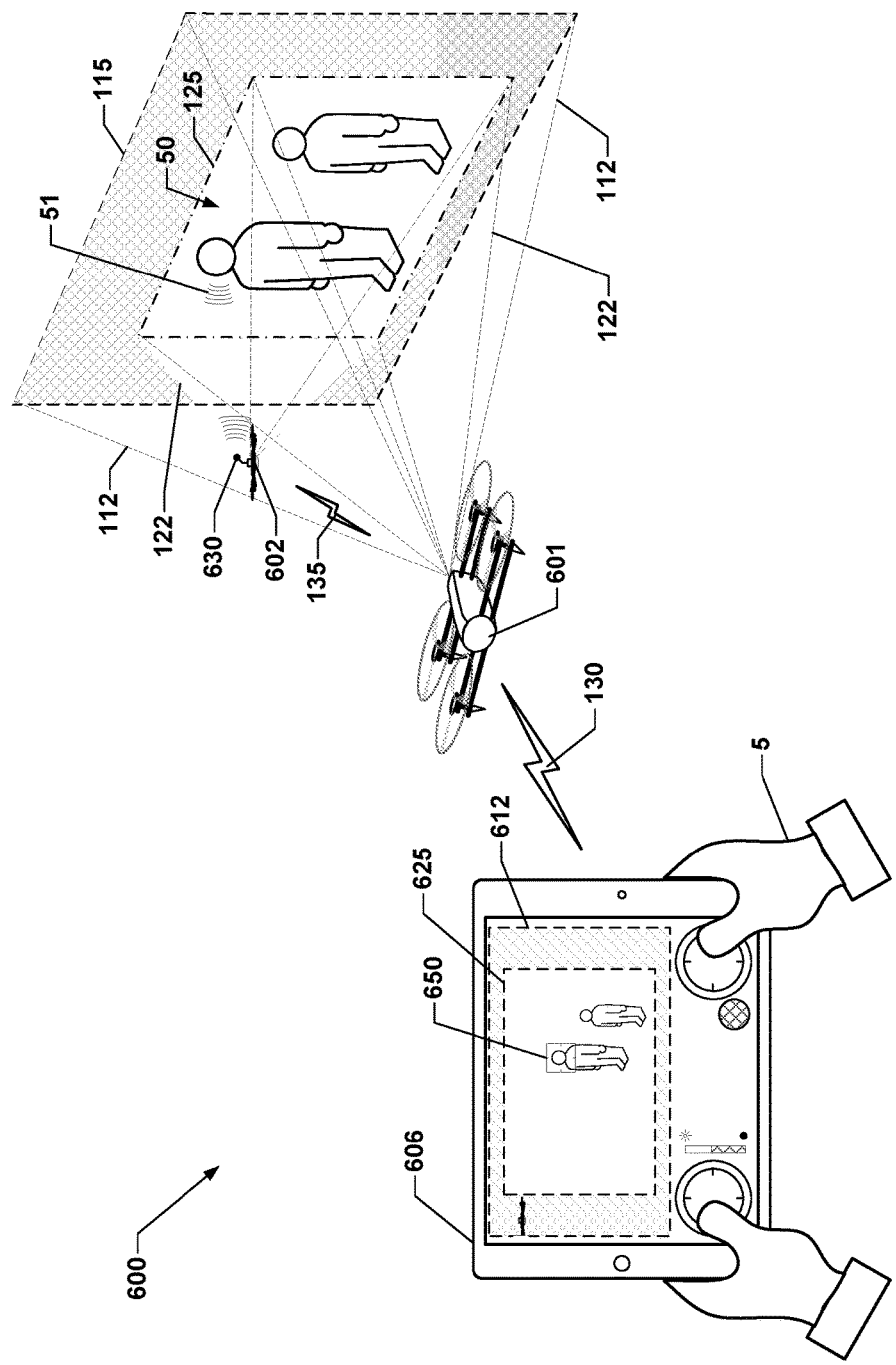
FIG. 6 is a schematic perspective view of an aerial imaging system including a first UAV capturing an image of targets a second UAV is illuminating while recording sounds from the targets according to various embodiments.

FIG. 6 illustrates an aerial imaging system 600 with a first UAV 601 (which, for example, may generally correspond to the first UAV 101, 301 in FIGS. 1-5) and a second UAV 602 (which, for example, may generally correspond to the second or other UAVs 102, 302, 303, 304, 305 in FIGS. 1-5) in accordance with various embodiments. With reference to FIGS. 1-6, the first UAV 601 includes a camera (e.g., 110) and is configured to receive input from the operator 5 via an operator communication link 130 to a wireless communication device 606 in the form of a tablet computer. The operator 5 may not only initiate and control the flight of the first UAV 601 but also may control the camera 110, such as for photographing a target 50.

The second UAV 602 may be configured to dock with and deploy from the first UAV 601. Also, the second UAV 602 includes a light (e.g., 120) for illuminating the target 50 being photographed by the first UAV 601. In addition, the second UAV 602 may include a microphone 630 configured to record sounds 51 from an area in which the target is located. The second UAV 602 may be controlled to fly near the target 50 being photographed to pick up audio. The second UAV 602 may then wirelessly transmit audio to the first UAV 601 using the inter-UAV communication link 135. The first UAV 601 may synchronize the received audio with video images being captured.

In various embodiments, the first UAV 601 may independently and/or automatically control the aerial position of the second UAV 602 in a closed loop fashion using feedback from resources onboard the first UAV 601. For example, the inter-UAV communication link (e.g., 135, 136 in FIGS. 1, 4A, 4B, and 6) may provide a distance and direction between the two UAVs 601, 602. Additionally, an onboard compass and/or GPS may provide information for determining a relative location of the first UAV 101 and/or the second UAV 102.

Various embodiments may use the camera (e.g., 110) (and/or other sensor(s)) not only for photography but also to monitor, track and/or change the position of the second UAV 602. The processer (e.g., 160 in FIG. 5) in the first UAV 601 may control the second UAV 602 based on data from the camera, such as a first image 612 of the field of view 112 from the camera. If the second UAV 602 is maintained within the field of view 112, the processor in the first UAV 601 may determine an aerial position of the second UAV 602 based on the size and position of the second UAV 602 within the first image 612. Meanwhile, a second image 625 that cuts out the second UAV 602 may be used for more conventional image capture. Optionally, the first and second images 612, 625 may be rendered from a single still image captured by the camera or rendered from the same stream of video images captured by the camera. Additionally, based on a focus region 650 on the target 50 in the first image 612, a focal distance may be determined between the camera (i.e., the first UAV 601) and the target 50. Using the focal distance, a processor in the first UAV 601 may calculate a first distance between the two UAVs 601, 602. Using this calculated first distance, the processor may determine a second distance between the second UAV 602 and the target 50.

Various embodiments may use the camera to optimize illumination, including holding illumination on moving targets. The second UAV 602 may hover a predetermined distance from the first UAV 601, unless the amount of light being received from the target 50 is more or less than desirable. The predetermined distance may be a default distance and/or relative aerial position. Alternatively, the predetermined position may be determined by the processor based on current conditions (e.g., ambient lighting). For example, one or both of the first UAV 601 and the second UAV 602 may include a light sensor (e.g., sensor 182 in FIG. 5). In response to the processor of the first UAV 601 determining the amount of light is more or less than desirable, the second UAV 602 may be commanded to move further from or closer to the target 50, respectively. Alternatively, in response to the processor of the first UAV 601 determining the amount of light is more or less than desirable, the second UAV 602 may be commanded to change to brightness emitted by the light accordingly.

In various embodiments, the second UAV 602 may independently and/or automatically control its own aerial position relative to the first UAV 601 and/or the target 50. For example, the second UAV 602 may use an onboard proximity sensor to maintain a determined aerial position relative to the first UAV 601 and/or the target 50. Alternatively, the second UAV 602 may include its own camera and processor for capturing and analyzing images of the first UAV 601 and/or the target 50. After receiving information about the target 50 from the first UAV 601, the processor onboard the second UAV 602 may be configured to recognize the target 50. Using target recognition, the second UAV 602 may maintain a fixed position relative to the target 50.

In various embodiments, the first and second UAVs 601, 602 may cooperate, exchanging information, to automatically control the aerial position of the second UAV 602. For example, the second UAV 602 may collect information about its aerial position, using communication links, GPS, compass, and/or images from a camera onboard the second UAV 602. The second UAV 602 may transmit the collected information to the first UAV 601 for processing and further controlling the second UAV 602.

In various embodiments, the first UAV (e.g., 101, 301, 601) may have generally the same components as the second UAV (e.g., 102, 302, 602) and/or additional UAVs (e.g., third, fourth, and fifth UAVs 303, 304, 305). Alternatively, the first UAV may have different components than the second and/or additional UAVs. For example, the second UAV may lack a GPS receiver and/or transceiver for establishing a WAN connection, since the second UAV may not need this information and/or may obtain such information from the first UAV (e.g., via an inter-UAV communication link 135). In addition, various embodiments may include additional UAVs (e.g., third UAV 303, fourth UAV 304, fifth UAV 305) in which one or more of the second UAV and additional UAVs may be different and/or have different components from one another.

Figure 7:
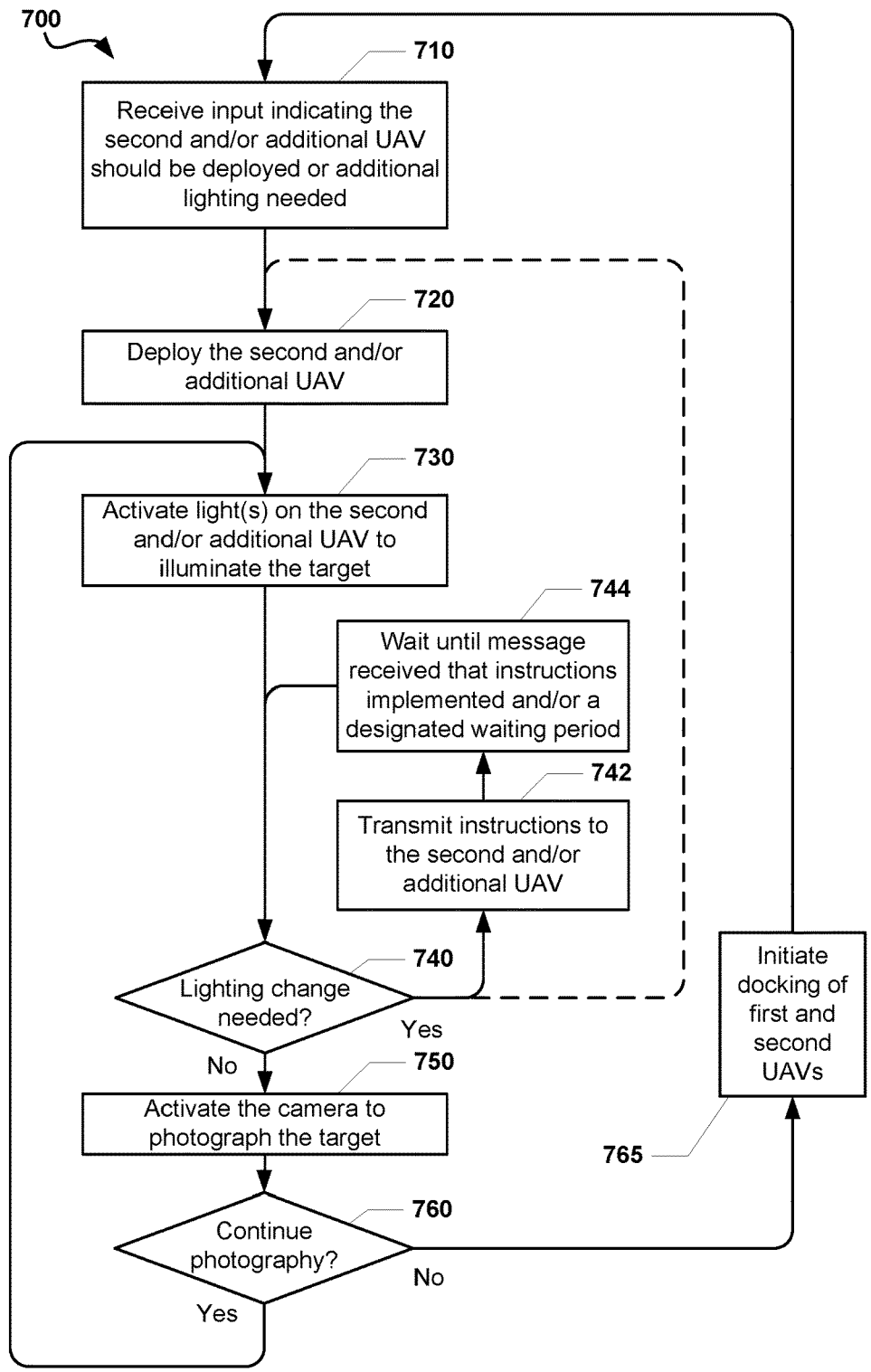
FIG. 7 is a process flow diagram illustrating a method of aerial imaging according to various embodiments.

FIG. 7 illustrates a method 700 of aerial imaging according to various embodiments. With reference to FIGS. 1-7, operations of the method 700 may be performed by a UAV control unit (e.g., 150 in FIG. 5) or another computing device (e.g., wireless control unit 6 in FIGS. 1, 4A, 4B, 5 and/or wireless communication device 606 in FIG. 6) in communication with the first UAV (e.g., 101, 301, 601 in FIGS. 1-6).

In block 710, the processor of the first UAV (e.g., the processor 160 in the control unit 150 or processor in a remote device, such as the wireless communication device 606) may receive an input indicating the second UAV and/or at least one additional UAV (e.g., the third, fourth, and/or fifth UAV 303, 304, 305) should be deployed. The input may be a manual input from the operator (e.g., 6 in FIG. 1), an input from another process (e.g., image processing analysis determines lighting needs adjustment, a knowledge base (e.g., in an onboard and/or remote database), or systems controlling the operation of the first UAV).

In block 720, the processor of the first UAV may deploy the second UAV and/or at least one additional UAV, which may involve releasing a latching mechanism and/or using an ejection mechanism to ensure the second and/or additional UAV quickly moves away from the first UAV. Prior to deploying the second and/or additional UAV, the processor may activate or otherwise cause to activate propellers on the second and/or additional UAV to prepare the second and/or additional UAV for flight. Once deployed, the second and/or additional UAV may automatically proceed to a designated aerial position relative to the first UAV, which may include more than one aerial position if multiple UAVs are deployed. The designated aerial position(s) may be predetermined (such as a default or preprogrammed position) or determined based on ambient or other conditions. Alternatively, the process may provide the second and/or additional UAV with instructions for the second and/or additional UAV to reach the designated aerial position(s).

In block 730, the processor of the first UAV may activate the light(s) on the second and/or additional UAV (if not already illuminated) to illuminate the target. The processor may transmit an activation signal via the inter-UAV communication link (e.g., 135 and/or 136 in FIGS. 4A and 4B) for activating the light(s).

In determination block 740, the processor may determine whether lighting for taking one or images (or video) needs to change. For instance, the processor may determine whether lighting in one or more images taken by the camera needs to change. The processor may assess temporary images captured by the camera to determine with the current lighting is too low, too high, or just right.

In response to determining that the lighting needs to be changed (i.e., determination block 740="Yes"), the processor may transmit one or more instructions to the second and/or additional UAV in block 742. The instruction(s) may indicate the second and/or additional UAV should change its aerial position, orientation of the light, and/or a lighting parameter (e.g., brightness) of the light on the second UAV. Accordingly, the second and/or additional UAV may make adjustments based on one or more of the instruction(s).

Optionally, in response to determining that the lighting needs to be changed (i.e., determination block 740="Yes"), the processor may also deploy one or more additional UAVs in block 720. For example, if supplemental and/or different lighting is needed and one or more additional UAVs are available, the one or more additional UAV may be deployed to implement needed lighting changes.

In block 744, the processor may wait until a message is received, indicating that the transmitted instructions have been implemented, before again determining whether the lighting needs to be changed in determination block 740. The message may be received from the second and/or addition UAV. Alternatively, the processor may allow a designated waiting time to pass to enable the changes from the transmitted instructions in block 742 to be implemented before determining whether the lighting needs to be changed further in determination block 740. Additionally, the designated waiting time may act as a time-out period in case no message is received from the second and/or addition UAV.

In response to determining that the lighting does not need to be changed (i.e., determination block 740="No"), the processor may activate the camera to photograph the target in block 750.

In determination block 760, the processor may determine whether the first UAV will continue photographing the target. The determination whether to continue may be based on input from the operator or a default setting. In response to determining to continue photography (i.e., determination block 760="Yes"), the processor may further activate the light(s), if the light(s) are not already illuminated, on the second and/or additional UAV in block 730. In response to determining not to continue photography (i.e., determination block 760="No"), the processor may initiate docking of the first and second UAVs in block 765. Once the first and second UAVs are docked, the process may await receipt of further input indicating the second UAV should be deployed in block 710.

Figure 8:
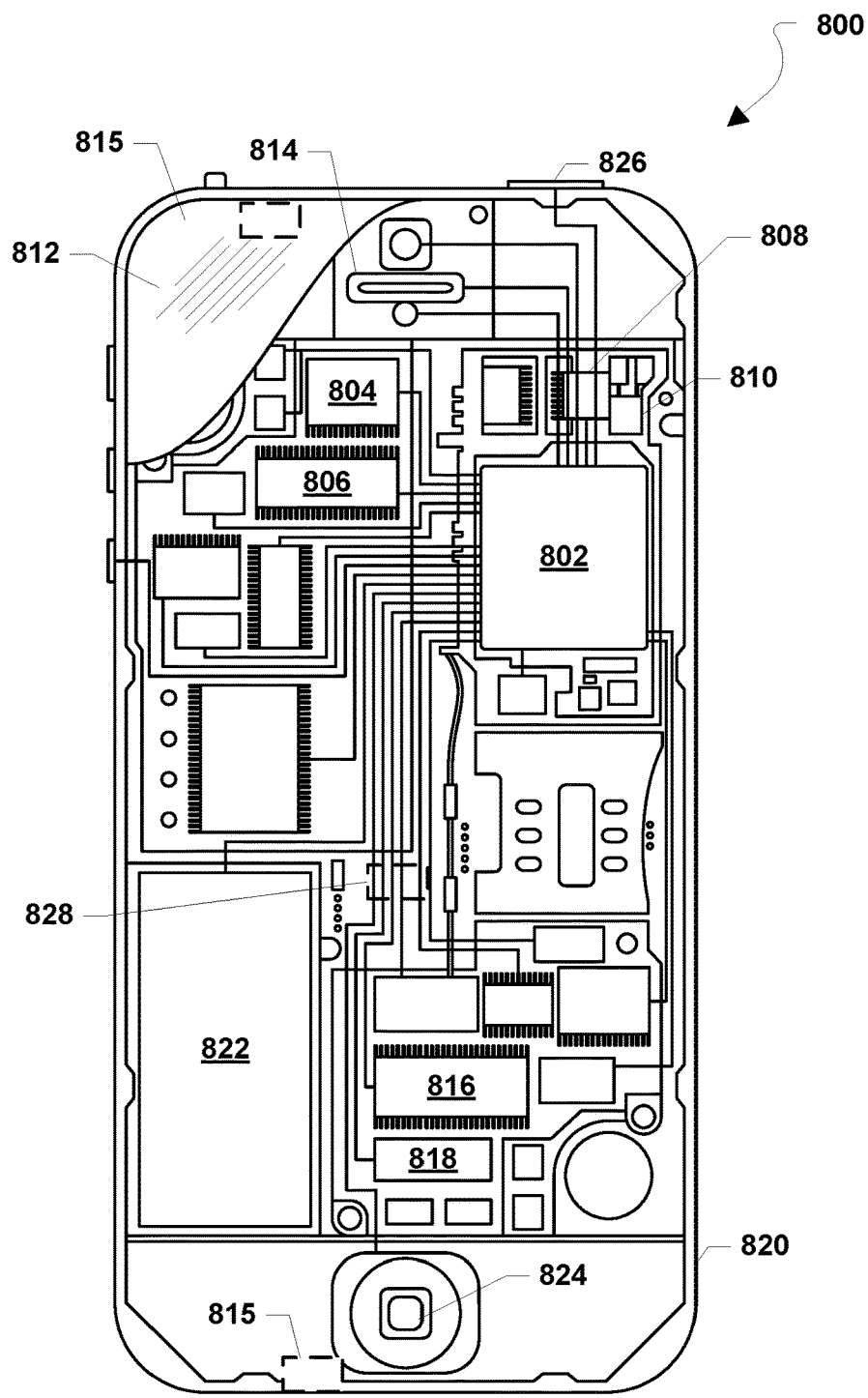
FIG. 8 is a component diagram of a wireless communication device suitable for use with various embodiments.

Communications with the first UAV (e.g., 101, 301, 601 in FIGS. 1-6) may be implemented using any of a variety of wireless communication devices (e.g., smartphones, tablets, smartwatches, etc.) an example of which is illustrated in FIG. 8. The wireless communication device 800 may include a processor 802 coupled with the various systems of the wireless communication device 800 for communication with and control thereof. For example, the processor 802 may be coupled to a touch screen controller 804, radio communication elements, speakers and microphones, and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. In another embodiment (not shown), the wireless communication device 800 may also be coupled to an external memory, such as an external hard drive.

The touch screen controller 804 and the processor 802 may also be coupled to a touch screen panel 812, such as a resistive-sensing touch screen, capacitive-sensing touch screen, infrared sensing touch screen, etc. Additionally, the display of the wireless communication device 800 need not have touch screen capability. The wireless communication device 800 may have one or more radio signal transceivers 808 (e.g., Peanut, Bluetooth, Bluetooth LE, ZigBee, Wi-Fi®, radio frequency (RF) radio, etc.) and antennae, the wireless communication device antenna 810, for sending and receiving communications, coupled to each other and/or to the processor 802. The radio signal transceivers 808 and the wireless communication device antenna 810 may be used with the above-mentioned circuitry to implement the various wireless transmission protocol stacks and interfaces. The wireless communication device 800 may include a cellular network wireless modem chip 816 coupled to the processor that enables communication via a cellular network.

The wireless communication device 800 may include a peripheral device connection interface 818 coupled to the processor 802. The peripheral device connection interface 818 may be singularly configured to accept one type of connection, or may be configured to accept various types of physical and communication connections, common or proprietary, such as USB, FireWire, Thunderbolt, or PCIe. The peripheral device connection interface 818 may also be coupled to a similarly configured peripheral device connection port (not shown).

In various embodiments, the wireless communication device 800 may include one or more microphones 815. For example, the wireless communication device may have microphones 815 that are conventional for receiving voice or other audio frequency energy from a user during a call.

The wireless communication device 800 may also include speakers 814 for providing audio outputs. The wireless communication device 800 may also include a housing 820, constructed of a plastic, metal, or a combination of materials, for containing all or some of the components discussed herein. The wireless communication device 800 may include a power source 822 coupled to the processor 802, such as a disposable or rechargeable battery. The rechargeable battery may also be coupled to the peripheral device connection port to receive a charging current from a source external to the wireless communication device 800. The wireless communication device 800 may also include a physical button 824 for receiving user inputs. The wireless communication device 800 may also include a power button 826 for turning the wireless communication device 800 on and off.

In various embodiments, the wireless communication device 800 may further include an accelerometer 828, which senses movement, vibration, and other aspects of the device through the ability to detect multi-directional values of and changes in acceleration. In the various embodiments, the accelerometer 828 may be used to determine the x, y, and z positions of the wireless communication device 800. Using the information from the accelerometer, a pointing direction of the wireless communication device 800 may be detected.

The various embodiments illustrated and described are provided merely as examples to illustrate various features of the claims. However, features shown and described with respect to any given embodiment are not necessarily limited to the associated embodiment and may be used or combined with other embodiments that are shown and described. Descriptions of various embodiments in terms of a lighting UAV docking with a camera-carrying UAV to enable one UAV to fly both vehicles to a photography location are provided merely as examples, because the roles of the UAVs may be reversed and the two (or more UAVs) may dock with a third UAV that ferries all UAVs to a photography site as described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. An aerial imaging system, comprising:
a first unmanned aerial vehicle (UAV) including a camera and configured to receive input from an operator; and a second UAV configured to dock with and deploy from the first UAV, the second UAV comprising a light configured to provide illumination for the camera, wherein the second UAV is configured to fly to a position relative to a target of photography by the camera in order to provide a determined amount of illumination of the target of photography by the camera.

2. The aerial imaging system of claim 1, wherein the second UAV is configured to fly separate from the first UAV without the input from the operator.

3. The aerial imaging system of claim 1, wherein the first UAV is configured to fly while the second UAV is docked on the first UAV.

4. The aerial imaging system of claim 1, wherein the second UAV includes a microphone configured to record sounds.

5. The aerial imaging system of claim 1, further comprising:
a third UAV configured to dock with and deploy from the first UAV, wherein the first UAV is configured to fly while supporting both the second UAV and the third UAV.

6. The aerial imaging system of claim 1, wherein the camera and the first UAV are configured to use camera images for controlling the second UAV.

7. The aerial imaging system of claim 1, wherein the camera is configured to contemporaneously capture two or more different images.

8. The aerial imaging system of claim 7, wherein the camera is configured so that the two or more different images overlap.

9. The aerial imaging system of claim 1, wherein the first UAV includes a processor configured to determine a position of the second UAV from a first image from the camera.

10. The aerial imaging system of claim 9, wherein the processor is further configured to determine the position of the second UAV from camera images.

11. The aerial imaging system of claim 1, wherein the first UAV includes a processor configured to determine an aerial position of the second UAV flying separate from the first UAV based on a comparison of camera images and images received from the second UAV.

12. The aerial imaging system of claim 1, wherein the second UAV is configured to fly separate from the first UAV to a predetermined aerial position relative to the first UAV.

13. The aerial imaging system of claim 1, wherein the second UAV is configured to use signals received from a proximity sensor to maintain a determined aerial position of the second UAV relative to the target of photography by the camera.

14. The aerial imaging system of claim 1, wherein the second UAV includes a processor configured to recognize the target of photography by the camera in images obtained from an image capture device on the second UAV.

15. The aerial imaging system of claim 1, wherein the second UAV includes a processor configured to independently control flight of the second UAV separate from the first UAV and maintain an aerial position of the second UAV relative to the target of photography by the camera.

16. The aerial imaging system of claim 1, wherein an amount of illumination provided by the light on the second UAV is adjustable.

17. The aerial imaging system of claim 1, wherein the light emits in an infrared spectrum and the camera is configured for thermal imaging.

18. The aerial imaging system of claim 1, wherein the first UAV includes a processor configured to:
determine the determined amount of illumination provided by the light on the second UAV;
determine an adjustment for the determined amount of illumination provided by the light on the second UAV; and
transmit instructions to the second UAV for making the adjustment for the determined amount of illumination provided by the light on the second UAV.

19. A method of capturing a visual image, comprising:
deploying, from a first unmanned aerial vehicle (UAV) including a camera, a second UAV to fly separate from the first UAV;
activating a light on the second UAV to illuminate a target of photography by the camera on the first UAV; and
activating the camera on the first UAV to photograph the target of photography by the camera on the first UAV illuminated by the light from the second UAV.

20. The method of claim 19, further comprising:
re-docking the second UAV with the first UAV after activating the camera on the first UAV to photograph the target of photography.

21. The method of claim 19, further comprising flying the second UAV separate from the first UAV without input from a remotely controlling operator of the first UAV.

22. The method of claim 19, further comprising flying the first UAV while the second UAV is docked on the first UAV.

23. The method of claim 19, further comprising:
activating a microphone on the second UAV for recording sounds emanating from a target of a sound recording.

24. The method of claim 19, further comprising:
deploying, from the first UAV, a third UAV configured to dock with and deploy from the first UAV; and
flying the first UAV while supporting both the second UAV and the third UAV.

25. The method of claim 19, further comprising:
determining a position of the second UAV using camera images from the camera on the first UAV for controlling the second UAV.

26. The method of claim 19, further comprising:
determining the determined amount of illumination provided by the light on the second UAV;
determining an adjustment for the determined amount of the illumination provided by the light on the second UAV; and
transmitting instructions to the second UAV for making the adjustment for the determined amount of the illumination provided by the light on the second UAV.

27. An aerial imaging system, comprising:
a first unmanned aerial vehicle (UAV), wherein the first UAV comprises:
means for capturing visual images; and
means for receiving input from an operator for flying the first UAV and activating the means for capturing visual images; and
a second UAV, wherein the second UAV comprises:
means for emitting light to provide illumination for the means for capturing visual images; and
means for docking with and deploy from the first UAV, wherein the second UAV is configured to fly to a position relative to a target of the means for capturing visual images in order for the means for emitting light to provide illumination of the target.

28. A non-transitory processor-readable storage medium having stored thereon processor-executable instructions configured to cause a processor of a first unmanned aerial vehicle (UAV) to perform operations comprising:
- deploying a second UAV from the first UAV and flying the second UAV separate from the first UAV;
- activating a light on the second UAV to illuminate a target of photography by a camera on the first UAV; and
- activating the camera on the first UAV to photograph the target of photography illuminated by the light from the second UAV.

* * * * *